US007272908B2

(12) United States Patent
Jones

(10) Patent No.: US 7,272,908 B2
(45) Date of Patent: Sep. 25, 2007

(54) FISHING FLOAT

(76) Inventor: Charles R. Jones, 419 W. Michigan, Greensburg, KS (US) 67054

( * ) Notice: Subject to any disclaimer, the term of this patent is extended or adjusted under 35 U.S.C. 154(b) by 372 days.

(21) Appl. No.: 11/007,763

(22) Filed: Dec. 8, 2004

(65) Prior Publication Data

US 2006/0117639 A1 Jun. 8, 2006

(51) Int. Cl.
*A01K 93/02* (2006.01)

(52) U.S. Cl. ............................ 43/17.5; 43/17; 43/44.9

(58) Field of Classification Search ...................... 43/4, 43/17, 17.5, 44.87, 44.9

See application file for complete search history.

(56) References Cited

U.S. PATENT DOCUMENTS 1,974,832 A * 9/1934 Peterson ...................... 441/13
2,490,669 A * 12/1949 Burke ........................... 43/17
2,988,840 A * 6/1961 Seigle ........................... 43/17
3,559,224 A * 2/1971 Shimizu ...................... 441/17
3,656,251 A * 4/1972 Snider et al. .................. 43/17
3,693,278 A * 9/1972 Mahone, Jr. ................. 43/17.5
3,710,500 A * 1/1973 Pena .......................... 43/17.5
3,798,822 A * 3/1974 Lampus ...................... 43/17.5
4,020,580 A * 5/1977 Chappell et al. ............. 43/17.5
4,437,255 A * 3/1984 Reed ............................. 43/17
4,486,969 A * 12/1984 Swenson ....................... 43/17
4,748,761 A * 6/1988 Machovina .................... 43/17
4,805,337 A * 2/1989 Kurata ....................... 43/17.5
4,916,846 A * 4/1990 Pehm ......................... 43/17.5
5,036,615 A * 8/1991 Lu ............................ 43/17.5
5,052,145 A * 10/1991 Wang ......................... 43/17.5
5,154,016 A * 10/1992 Fedora et al. ................ 43/26.1
5,351,432 A * 10/1994 Tse ........................... 43/17.5
5,758,449 A * 6/1998 Munsterman et al. .......... 43/17
5,819,465 A * 10/1998 Bryant .......................... 43/16
5,898,372 A * 4/1999 Johnson et al. .......... 340/573.2
5,974,721 A * 11/1999 Johnson et al. .............. 43/17.6
6,671,994 B1 * 1/2004 Klein ............................ 43/17
6,715,229 B2 * 4/2004 Chu ........................... 43/17.5
6,732,469 B2 * 5/2004 Lindgren .................... 43/17.5
6,822,927 B1 * 11/2004 Holm ......................... 367/107

FOREIGN PATENT DOCUMENTS

JP 4-187040 * 7/1992
JP 4-349839 * 12/1992

* cited by examiner

*Primary Examiner*—David Parsley
(74) *Attorney, Agent, or Firm*—Dale J. Ream

(57) ABSTRACT

A fishing float includes a housing having first and second portions. The housing first portion may contain a first light source and a first depth sensor. The housing second portion may contain a second light source and a second depth sensor. The housing may include a battery, orientation switch, CPU, and charging coil. An optional remote receiver unit includes a receiver and an interface. After the housing is cast, the orientation switch completes a circuit that automatically energizes the downward-facing light source (whether first or second). The corresponding downward-facing depth sensor (whether first or second) generates water depth data. The CPU may actuate the upward-facing light source to indicate the water depth data and may actuate the charging coil's transmission of this data to the receiver unit. The housing rotates when a hook is struck, flashing the downward-facing light source. Inducing current in the charging coil may recharge the battery.

5 Claims, 9 Drawing Sheets

FISHING FLOAT

BACKGROUND OF THE INVENTION

This invention relates generally to a fishing float. In particular, the present invention relates to a float having a light source for visually signaling a fisherman.

Fishermen often use floats for suspending bait in the water while fishing. A traditional float is securely attached to fishing line at a fixed point, causing the float to move with the fishing line instead of sliding along it. When the fishing line is cast, the float rests on the water's surface and the fishing hook sinks to a predetermined depth. This has been a proven way to suspend bait at a specific depth. Traditional floats are susceptible to one problem, however: they often allow the hook and fishing line to become snagged on underwater debris when the hook is reeled in to the fishing pole. When the fishing line is broken due to being snagged, the line remains in the water and often entangles local wildlife such as ducks and geese.

Slip floats overcome this drawback present in traditional floats. Unlike traditional floats, a slip float is attached to a fishing line in a manner that allows the float to slide along the fishing line. A stop is attached to the fishing line at a predetermined point for setting the rest position of the float and determining how deep the fishing hook will sink. When the fishing line is cast, the float and hook reach the water's surface at approximately the same time. The hook then sinks and the float slides along the fishing line until it reaches the stop. When the float reaches the stop, the float remains at the stop on the water's surface and the hook remains suspended at the predetermined depth. When the fishing line is reeled in to the fishing pole, the hook first travels up through the water while the float slides along the line toward the hook. When the hook reaches the float, the hook and float are reeled to the fishing pole together. This means the hook will be at the water's surface instead of being submerged, and thus the hook will not have the opportunity to become snagged on underwater debris.

While traditional floats and slip floats have accordingly managed to suspend a fishing hook at a predetermined depth and allow the hook to be easily retrieved, they have not yet addressed other fishing concerns. Namely, when fishing in a dark or dimly-lit area, it can often be difficult for a fisherman to determine that his bait has been struck since he cannot see the float very well. A light present on the float would solve this problem. Further, today's fishermen are becoming more technologically demanding than ever before, and a float that determines and relays the depth of the water would be welcomed and much appreciated.

Various proposals for fishing floats are found in the art. Such floats are disclosed in U.S. Pat. Nos. 4,291,484; 4,359,836; 4,458,439; 5,615,512; and 5,974,721. While assumably effective for their intended purposes, the existing devices do not provide a fishing float that is lighted on whichever side is lowest at a given point in time, determines and relays the depth of the water, and includes a convenient and safe method of charging its power source. Therefore, it would be desirable to have a fishing float with these characteristics.

SUMMARY OF THE INVENTION

A fishing float according to the present invention includes a housing having first and second portions. The housing first portion may contain a first light source and a first depth sensor, and the housing second portion may contain a second light source and a second depth sensor. Preferably, at least one battery is included to energize various components, at least one orientation switch is included to sense the housing's orientation and automatically complete an electrical circuit, at least one CPU may be included, and at least one charging coil may be included to recharge the at least one battery and to act as a transmission antenna. An optional receiver unit remote from the housing may include a receiver and a user interface.

In use, after the housing is cast, the orientation switch completes an electrical circuit that automatically energizes the light source (whether first or second) that faces downward. The corresponding depth sensor that faces downward (whether first or second) may determine the depth of the water and generate water depth data which may be electrically communicated to the CPU. The CPU may actuate the light source facing upward (whether first or second) to indicate the water depth data, and the CPU may actuate the transmission of this data to the receiver unit by using the charging coil as a transmission antenna. When the fishing hook is struck, the entire housing is rotated approximately one-quarter of a turn, flashing the light source that was facing downward. This may be easily seen by a fisherman, even in dark or dimly-lit areas. The housing may be retrieved in a manner that keeps the fishing hook at the water's surface instead of being submerged, thus keeping the hook from becoming snagged on underwater debris. The battery may be recharged by inducing a current in the charging coil.

Therefore, a general object of this invention is to provide a fishing float that signals when bait has been struck.

Another object of this invention is to provide a fishing float, as aforesaid, that is lighted on whichever side is lowest at a given point in time.

Still another object of this invention is to provide a fishing float, as aforesaid, that can determine and convey the depth of the water.

Yet another object of this invention is to provide a fishing float, as aforesaid, that floats stably.

A further object of this invention is to provide a fishing float, as aforesaid, that is easy and economical to manufacture.

A still further object of this invention is to provide a fishing float, as aforesaid, that may be easily seen, even by people with colorblindness.

An even further object of this invention is to provide a fishing float, as aforesaid, that may be used during the day or at night.

Other objects and advantages of this invention will become apparent from the following description taken in connection with the accompanying drawings, wherein is set forth by way of illustration and example, embodiments of this invention.

DESCRIPTION OF THE PREFERRED EMBODIMENTS

A fishing float according to the present invention will now be described in detail with reference to FIGS. 1 through 8 of the accompanying drawings. More particularly, a fishing float 100 includes a housing 110 (FIGS. 1 through 5).

The housing 110 is constructed of a buoyant material for floating on a water surface and has first and second portions 112*a*, 112*b*. The first portion 112*a* has a configuration for facing downward when the second portion 112*b* faces upward, and the second portion 112*b* has a configuration for facing downward when the first portion 112*a* faces upward. The housing 110 defines a center point 113 (FIG. 3*b*) and preferably has an annular portion 114 (FIG. 1) for slidably attaching the housing 110 to a fishing line 20 (FIGS. 5*a* through 5*c*), though other ways of attaching the housing 110 to the fishing line 20 are also feasible. Further, while other configurations are possible, the housing 110 preferably has a bow-tie-shaped configuration 110*a* (FIG. 1) defining an interior space for holding other components to be described in more detail later. This bow-tie-shaped configuration 110*a* provides stable floating characteristics for the housing 110. The housing first portion 112*a* may include a first color indicium, and the housing second portion 112*b* may include a second color indicium different from the first color indicium to provide visual contrast between the first and second portions 112*a*, 112*b*. Nonexclusive examples of the first and second color indicia include red, yellow, green, pink, and orange.

Figure 1:
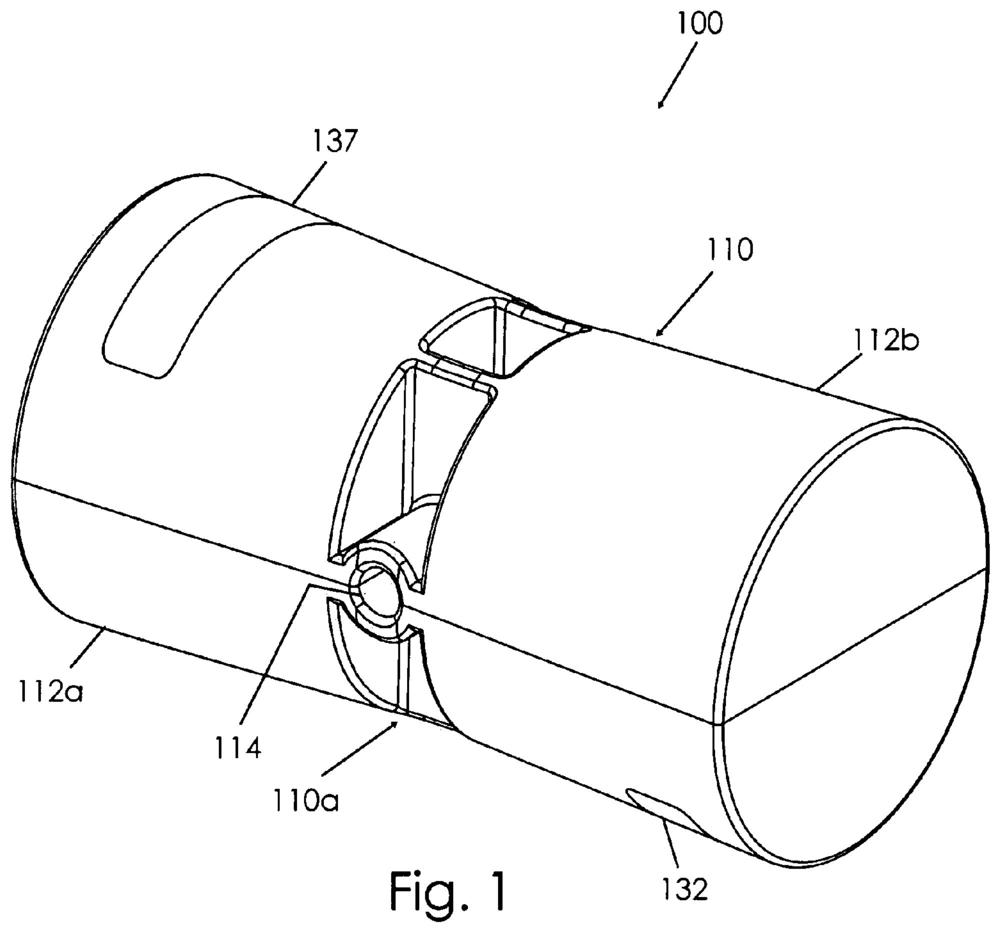
FIG. 1 is a perspective view of a fishing float according to the present invention without depth sensors.
Figure 2A:
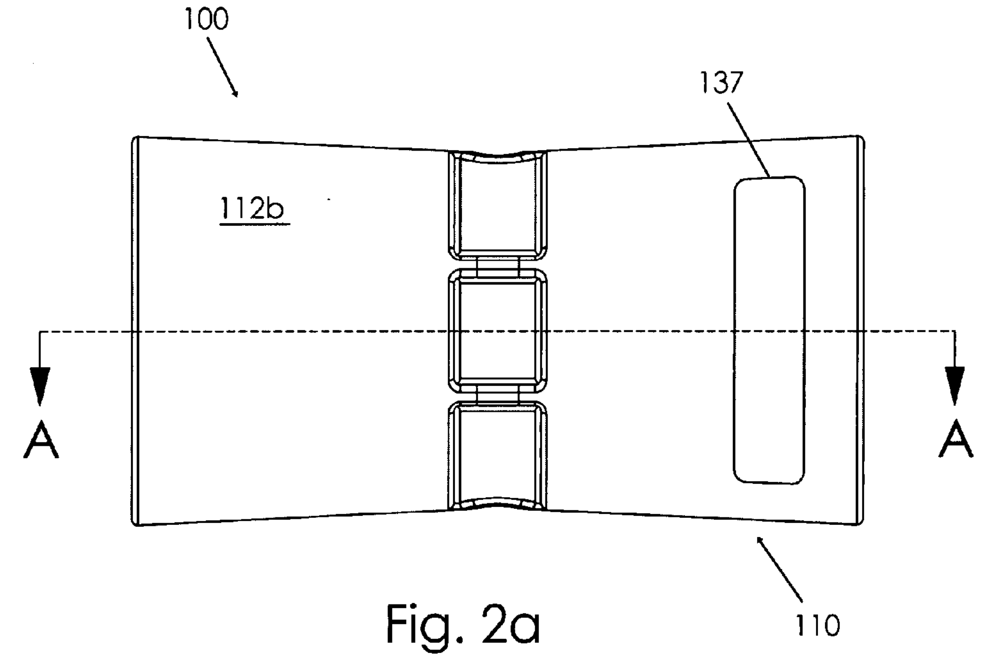
FIG. 2*a* is a top view of the fishing float as in FIG. 1*a;*
Figure 2B:
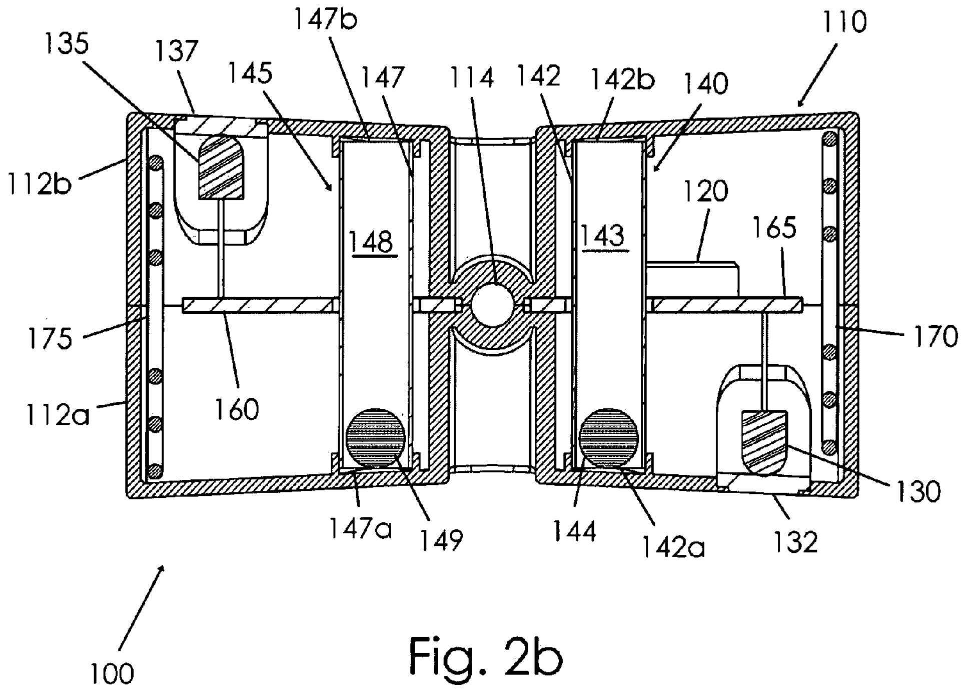
FIG. 2*b* is a sectional view of the fishing float taken along line A-A of FIG. 2*a;*
Figure 3A:
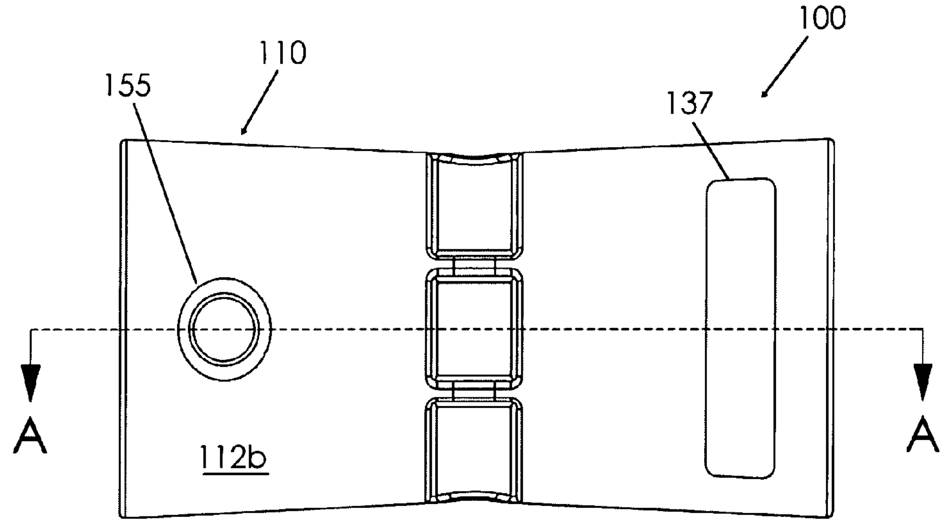
FIG. 3*a* is a top view of the fishing float as in FIG. 1*a* with depth sensors.
Figure 3B:
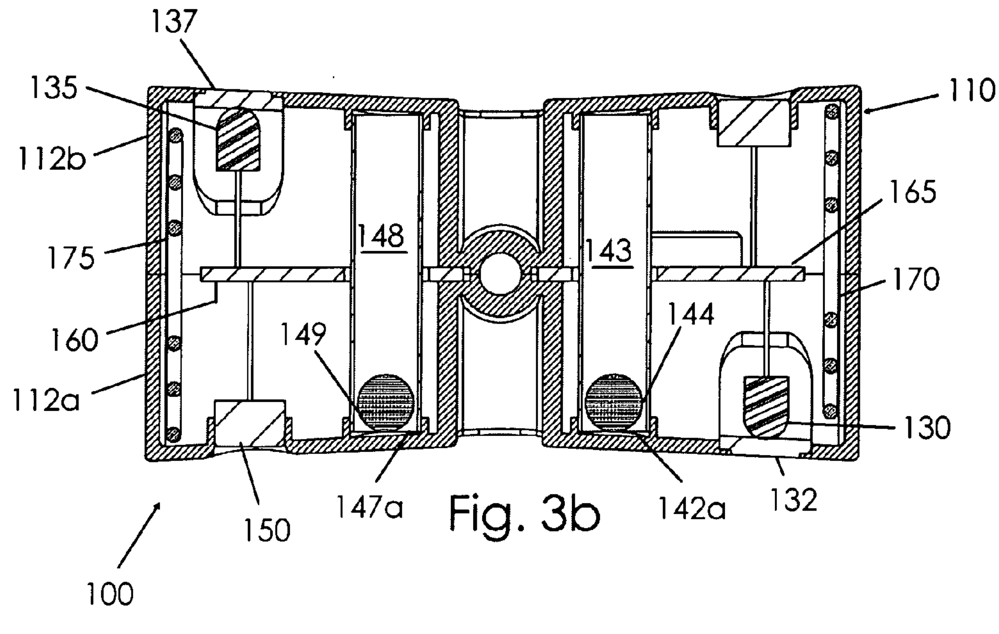
FIG. 3*b* is a sectional view of the fishing float taken along line A-A of FIG. 3*a;*
Figure 4:
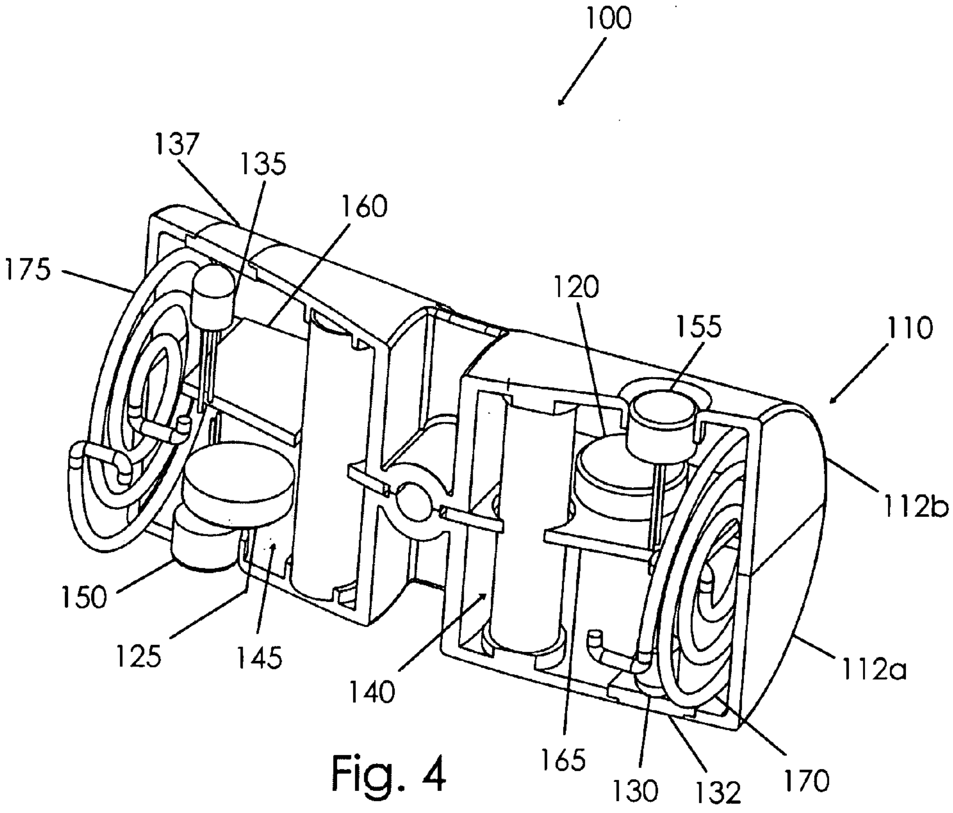
FIG. 4 is a perspective view of the fishing float as in FIG. 3*a* with the housing, the first CPU, and the second CPU partially cut away.
Figure 8:
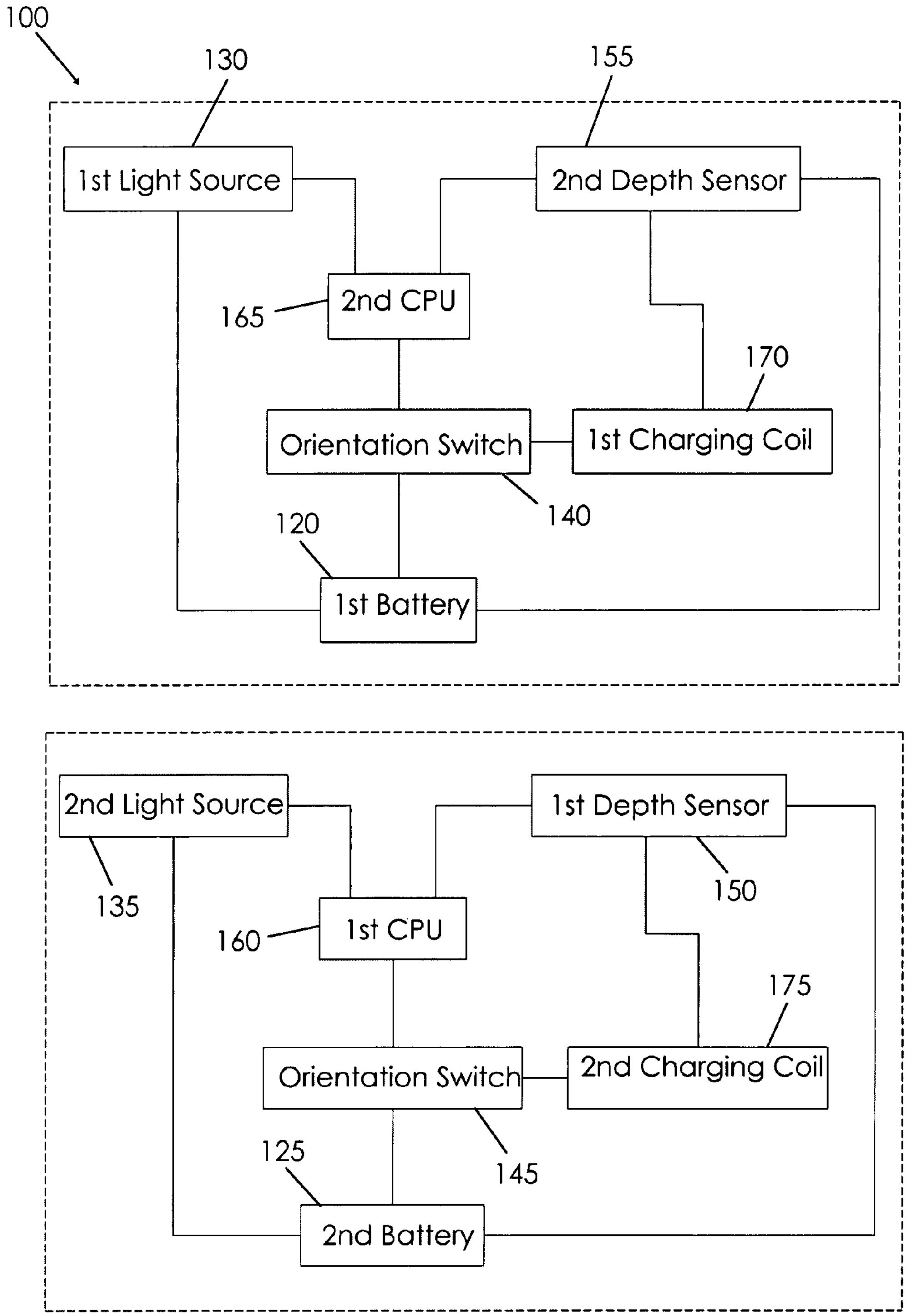
FIG. 8 is a block diagram of the fishing float as in FIG. 3*a*.

The fishing float 100 includes a first light source 130 positioned in the first portion 112*a* of the housing 110 and electrically connected to a first battery 120 (FIGS. 2*b*, 3*b*, and 8). A first orientation switch 140 is electrically connected to the first light source 130 and to the first battery 120 for automatically energizing the first light source 130 when the housing first portion 112*a* faces downward (FIG. 8). A second light source 135 may be positioned in the second portion 112*b* of the housing 110 and electrically connected to a second battery 125 (FIGS. 2*b*, 3*b*, and 8). A second orientation switch 145 may be electrically connected to the second light source 135 and to the second battery 125 for automatically energizing the second light source 135 when the housing second portion 112*b* faces downward (FIG. 8). The first and second light sources are preferably positioned approximately equidistant from the housing center point 113 to add stability to the housing 110 and are preferably covered by first and second light source lenses 132, 137, respectively (FIG. 3*b*). The first and second orientation switches 140, 145 are preferably positioned approximately equidistant from the housing center point 113 to add stability to the housing 110 (FIG. 3*b*). The first and second light sources 130, 135 are preferably LEDs because of the size and efficiency of LEDs, though other light sources are possible. The first and second orientation switches 140, 145 are preferably tubes 142, 147 containing a viscous fluid 143, 148 and a weight 144, 149 (FIGS. 2*b* and 3*b*). Other orientation switches may be used, however.

The fishing float 100 may also include a first depth sensor 150 positioned in the first portion 112*a* of the housing 110 and electrically connected to the second battery 125 for generating water depth data when the housing first portion 112*a* is in a first configuration (preferably facing downward). A second depth sensor 155 may be positioned in the second portion 112*b* of the housing 110 and electrically connected to the first battery 120 for generating water depth data when the housing second portion 112*b* is in a configuration different from the first configuration (preferably facing downward). The first and second depth sensors 150, 155 are preferably ultrasonic sensors because of their inexpensive cost and their small size.

A first CPU 160 may be electrically connected to the first depth sensor 150, the second light source 135, and the second battery 125 and may be programmed for actuating the second light source 135 to indicate respective water depth data generated by the first depth sensor 150 (FIG. 8). The first CPU 160 may also be programmed for actuating the transmission of first depth signals 152 corresponding to respective water depth data generated by the first depth sensor 150. The first CPU 160 may of course include circuitry for completing the above-mentioned tasks instead of being programmed to do so.

A second charging coil 175 may be electrically connected to the first CPU 160 for transmitting the first depth signals 152, and the second charging coil 175 may be electrically connected to the second battery 125 for inducing a current and charging the second battery 125 (FIG. 8). A rectifier may be used to convert the alternating current from the second charging coil 175 to direct current used by the second battery 125.

A second CPU 165 may be electrically connected to the second depth sensor 155, the first light source 130, and the first battery 120 and may be programmed for actuating the first light source 130 to indicate respective water depth data generated by the second depth sensor 155 (FIG. 8). The second CPU 165 may also be programmed for actuating the transmission of second depth signals corresponding to respective water depth data generated by the second depth sensor 155. The second CPU 165 may of course include circuitry for completing the above-mentioned tasks instead of being programmed to do so.

Figure 6:
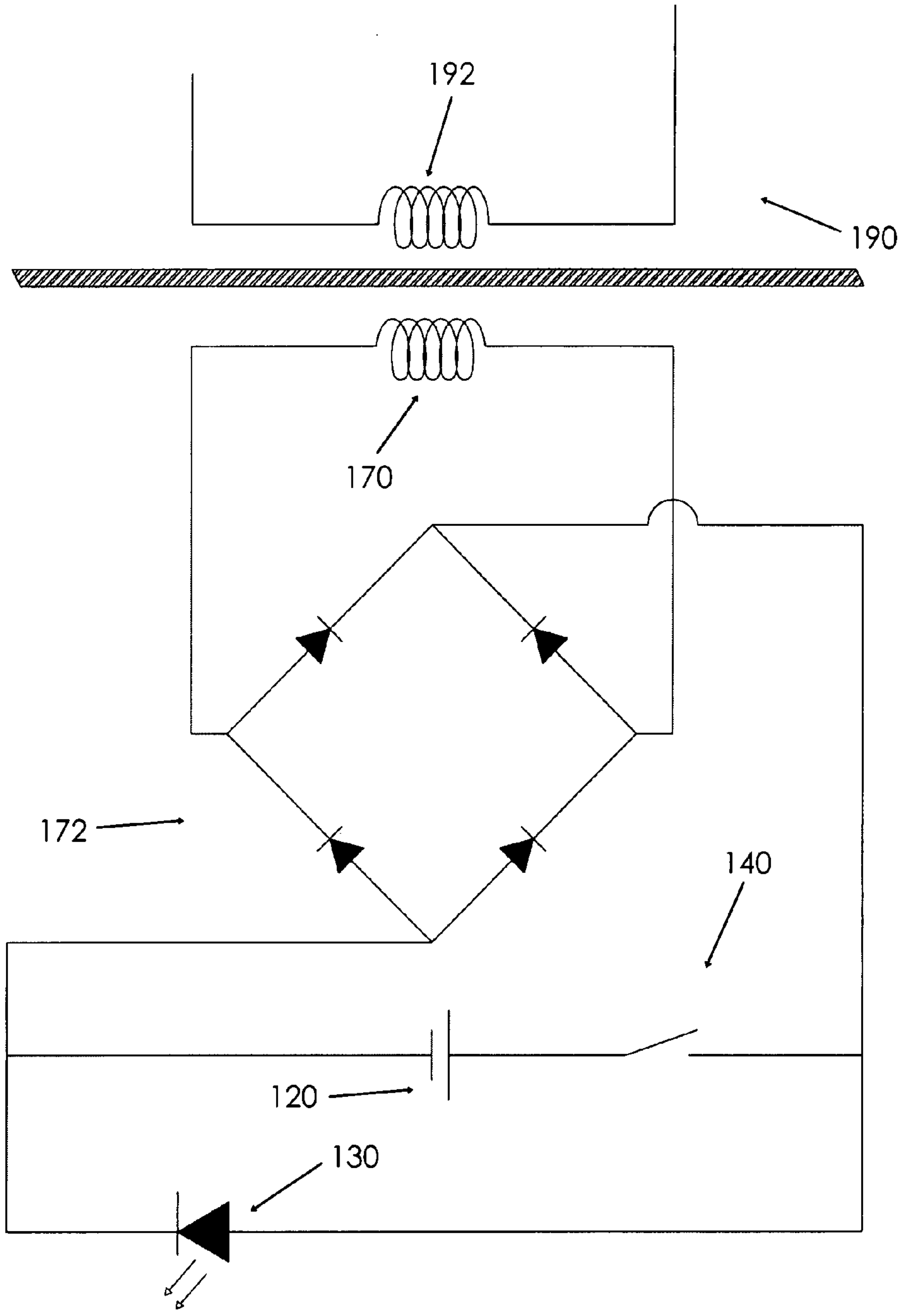
FIG. 6 is a circuit diagram showing the relationship between the first battery, the first orientation switch, the first light source, the first charging coil, the rectifier, and the charging device.

A first charging coil 170 may be electrically connected to the second CPU 165 for transmitting the second depth signals, and the first charging coil 170 may be electrically connected to the first battery 120 for inducing a current and charging the first battery 120 (FIGS. 6 and 8). A rectifier 172 (FIG. 6) may be used to convert the alternating current from the first charging coil 170 to direct current used by the first battery 120.

The fishing float 100 may further include a receiver unit 180 (FIG. 7) remote from the housing 110. The receiver unit 180 may include a receiver 182 for receiving the first and second depth signals transmitted by the first and second charging coils 170, 175. The receiver unit 180 may also have a user interface 184 for indicating the water depth data determined by the first and second depth sensors 150, 155.

The user interface 184 is preferably a visual display such as a LCD screen or a LED array, but it is of course possible to incorporate other interfaces.

Figure 5A:
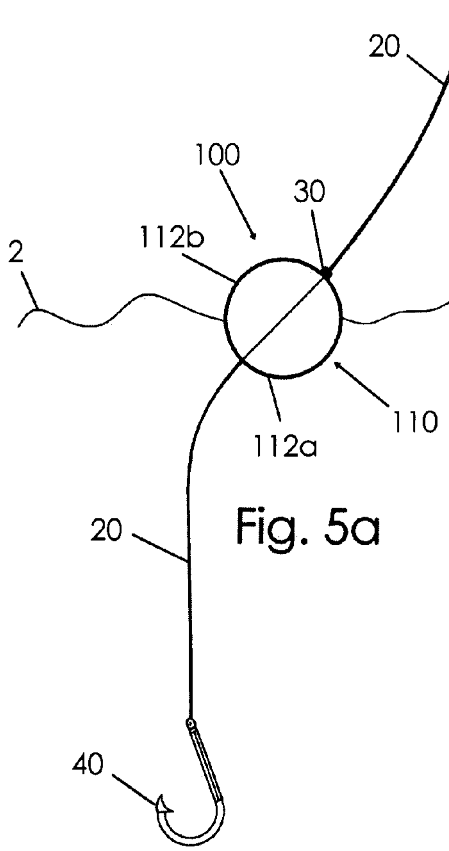
FIG. 5*a* is a side view of the fishing float as in FIG. 3*a* in use.
Figure 5B:
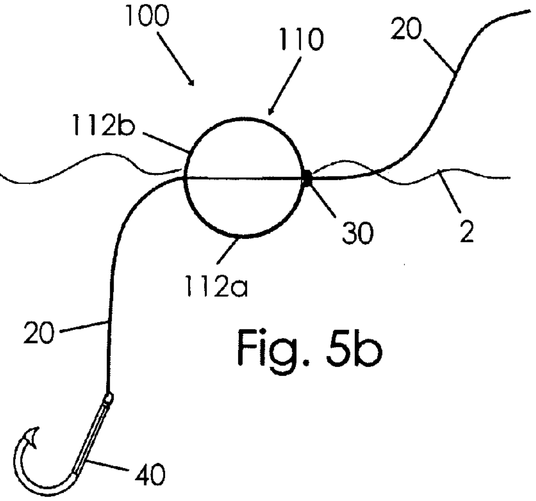
FIG. 5*b* is a side view of the fishing float as in FIG. 3*a* in use.
Figure 5C:
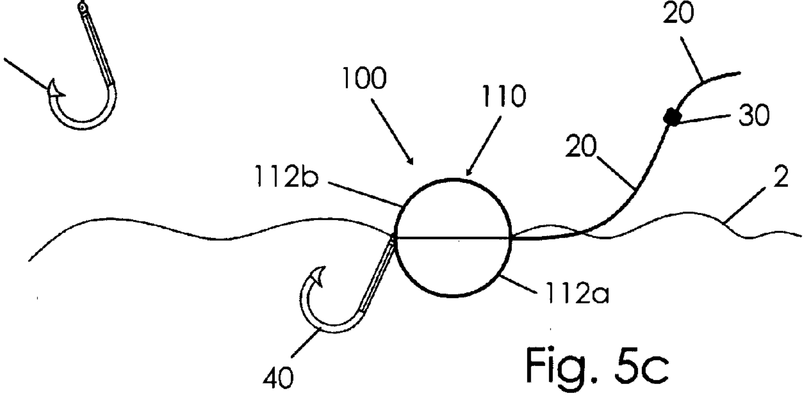
FIG. 5*c* is a side view of the fishing float as in FIG. 3*a* in use.

In use, a stop 30 is attached to the fishing line 20 at a predetermined point for setting the rest position of the fishing float 100 and determining how deep a fishing hook 40 will sink (FIGS. 5*a* through 5*c*). The fishing line 20 is slidably attached to the annular portion 114 of the housing 110, and the fishing hook 40 is attached to the fishing line 20. When the fishing line 20 is cast, the float 100 and hook 40 reach the water's surface 2 at approximately the same time. The hook 40 then sinks and the float housing 110 slides along the fishing line 20 until it reaches the stop 30. When the housing 110 reaches the stop 30, the housing 110 remains at the stop 30 on the water's surface 2 and the hook 40 remains suspended at the predetermined depth (FIG. 5*b*). It must be appreciated that the fishing line 20 may alternately be fixedly attached to the housing 110, making the fishing float 100 a conventionally casting and floating fishing float.

It is notable that either the housing first portion 112*a* or the housing second portion 112*b* may be facing downward into the water. The first and second orientation switches 140, 145 may sense which housing portion 112*a*, 112*b* faces downward and which housing portion 112*a*, 112*b* faces upward.

If the housing first portion 112*a* faces downward, the weights 144, 149 travel downward through the viscous fluid 143, 148 and settle at a first end 142*a*, 147*a* of the respective tubes 142, 147 (FIGS. 2*b* and 3*b*). The weight 144 in the first orientation switch 140 completes an electrical circuit, causing the first battery 120 to automatically energize the first light source 130. The weight 149 in the second orientation switch 145 completes a separate electrical circuit, allowing the second battery 125 to energize the first depth sensor 150. When energized, the first depth sensor 150 determines the depth of the water (such as through transmitting pulses and measuring the reply delay if the sensor 150 is an ultrasonic sensor) and generates water depth data which is electrically communicated to the first CPU 160.

The water depth data may then be communicated to the fisherman in multiple ways using various means for conveying the water depth data to a user. First, the first CPU 160 may actuate the second light source 135 (which is facing upward) to indicate the water depth data. As an example, the first CPU 160 may cause the second light source 135 to blink slowly to indicate multiples of ten feet and quickly to indicate individual feet. Continuing this example, if the water is forty five feet deep, the CPU 160 may cause the second light source 135 to blink slowly four times and then quickly five times. As another example, the first CPU 160 may simply cause the second light source 135 to blink more slowly over deeper water and more quickly in shallow water.

Figure 7:
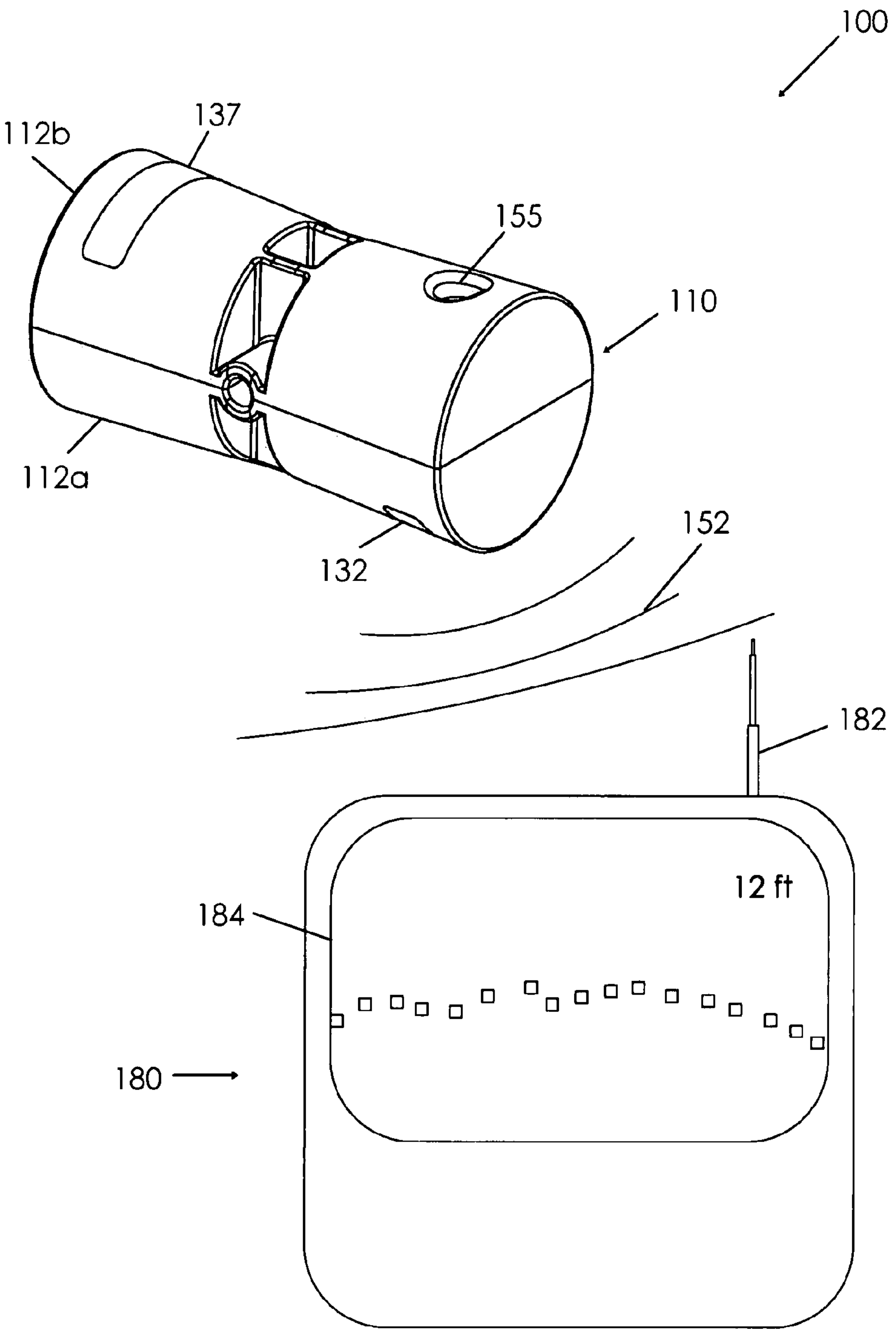
FIG. 7 is a perspective view of the fishing float as in FIG. 3*a* and a receiver unit.

Another way the water depth data may be communicated to the fisherman requires the receiver unit 180 (FIG. 7). Here, the first CPU 160 may actuate the transmission of the first depth signals 152 corresponding to the water depth data generated by the first depth sensor 150. The second charging coil 175 may be used as an antenna to transmit these first depth signals 152. The receiver 182 in the receiver unit 180 receives these first depth signals 152, and the user interface 184 displays the corresponding water depth data.

When the hook 40 has been struck, the entire housing 110 is rotated approximately one-quarter of a turn (FIG. 5*a*), flashing the first light source 130 and the first color indicium which were previously facing downward and thus hidden from view. This makes it easy for a fisherman to determine that his bait has been struck, even in dark or dimly-lit areas. Due to the viscous fluid 143, the weight 144 does not immediately depart from the tube first-end 142*a*. As a result, the first light source 130 remains energized even though the housing 110 is rotated.

If the housing second portion 112*b* had initially been facing downward instead of the housing first portion 112*a*, the components of the fishing float 100 act somewhat differently. The weights 144, 149 travel downward through the viscous fluid 143, 148 and settle at a second end 142*b*, 147*b* of the respective tubes 142, 147. The weight 149 in the second orientation switch 145 completes an electrical circuit, causing the second battery 125 to automatically energize the second light source 135. The weight 144 in the first orientation switch 140 completes a separate electrical circuit, allowing the first battery 120 to energize the second depth sensor 155. When energized, the second depth sensor 155 determines the depth of the water (such as through transmitting pulses and measuring the reply delay if the sensor 155 is an ultrasonic sensor) and generates water depth data which is electrically communicated to the second CPU 165.

The water depth data may then be communicated to the fisherman in multiple ways using various means for conveying the water depth data to a user. First, the second CPU 165 may actuate the first light source 130 (which is facing upward) to indicate the water depth data. This may be indicated as described above in regards to the first CPU 160 actuating the second light source 135 to indicate water depth data.

The second CPU 165 may alternately or additionally actuate the transmission of the second depth signals corresponding to the water depth data generated by the second depth sensor 155. The first charging coil 170 may be used as an antenna to transmit these second depth signals. The receiver 182 in the receiver unit 180 receives these first depth signals 152, and the user interface 184 displays the corresponding water depth data.

When the hook 40 has been struck, the entire housing 110 is rotated approximately one-quarter of a turn, flashing the second light source 135 and the second color indicium which were previously facing downward and thus hidden from view. This makes it easy for a fisherman to determine that his bait has been struck, even in dark or dimly-lit areas. Due to the viscous fluid 148, the weight 149 does not immediately depart from the tube second end 147*b*. As a result, the second light source 135 remains energized even though the housing 110 is rotated.

Regardless of which portion 112*a*, 112*b* initially faced downward, when the fishing line 20 is reeled in to the fishing pole, the hook 40 may first travel up through the water while the housing 110 slides along the line 20 toward the hook 40. When the hook 40 reaches the housing 110, the hook 40 and housing 110 are reeled to the fishing pole together (FIG. 5*c*). This means the hook 40 is at the water's surface instead of being submerged, and thus the hook 40 will not have the opportunity to become snagged on underwater debris.

To recharge the first and second batteries 120, 125, the first and second batteries may be placed near a charging device 190 having at least one charging coil 192 (FIG. 6). When a current is sent through the charging coil 192, a current may be induced in the neighboring first or second charging coil 170, 175, charging the respective first or second battery 120, 125. The charging device 190 may of course have two charging coils 192 and therefore induce a current in both the first and second charging coils 170, 175 and charge the first and second batteries 120, 125 at the same time. While other methods and equipment may be used to charge the batteries 120, 125 (such as conductive metal connections that travel from the exterior of the housing 110 to the batteries 120, 125 inside,) the inductive method described above is preferred for manufacturing reasons and to maintain the waterproof integrity of the housing 110. Simply replacing the batteries 120, 125 is not preferred for manufacturing and waterproofing reasons, but it is nonetheless feasible.

Figure 9:
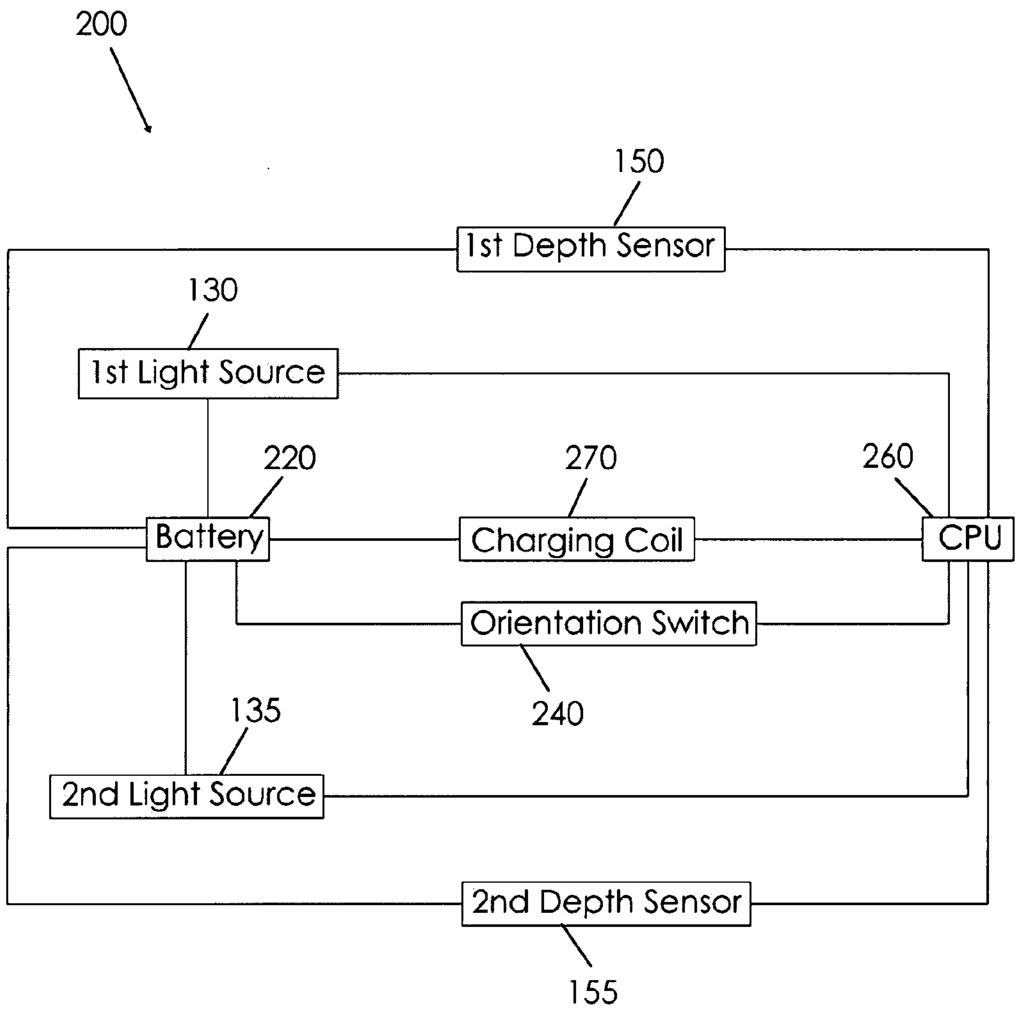
FIG. 9 is a block diagram of a fishing float according to another embodiment of the present invention.

A fishing float 200 according to another embodiment of the present invention is shown in FIG. 9 and includes a construction substantially similar to the construction previously described except as specifically noted below. More particularly, the fishing float 200 may include a single battery 220, a single orientation switch 240, a single CPU 260, and a single charging coil 270. Each of these single elements may include all of the features of the two elements it respectfully replaces (the first and second batteries 120, 125, the first and second orientation switches 140, 145, the first and second CPUs 160, 165, and the first and second charging coils 170, 175, respectfully) and perform all of the steps previously performed by the two elements it respectfully replaces.

As such, the battery 220 may be electrically connected to the first and second light sources 130, 135, the orientation switch 240, the first and second depth sensors 150, 155, the CPU 260, and the charging coil 270. The CPU 260 may be electrically connected to the first and second light sources 130, 135, the orientation switch 240, the first and second depth sensors 150, 155, and the charging coil 270.

In use, the fishing float 200 performs substantially similar to the fishing float 100, with the exception that steps previously performed by multiple elements are consolidated into single elements where possible. Instead of the first battery 120 energizing the first light source 130 and the second battery 125 energizing the second light source 135, for example, the battery 220 energizes both the first and second light sources 130, 135.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A fishing float, comprising:

a housing constructed of a buoyant material for floating on a water surface, said housing having first and second portions, said first portion having a configuration for facing downward when said second portion faces upward, said second portion having a configuration for facing downward when said first portion faces upward;

a first battery mounted in said housing;

a first light source positioned in said first portion of said housing and electrically connected to said first battery; a second battery mounted in said housing;

a second light source positioned in said second portion of said housing and electrically connected to said second battery;

a first orientation switch electrically connected to said first light source and to said first battery for automatically energizing said first light source when said housing first portion faces downward;

a second orientation switch electrically connected to said second light source and to said second battery for automatically energizing said second light source when said housing second portion faces downward;

a first depth sensor positioned in said first portion of said housing and electrically connected to said second battery for generating water depth data when said housing first portion faces downward;

a second depth sensor positioned in said second portion of said housing and electrically connected to said first battery for generating water depth data when said housing second portion faces downward;

a first CPU electrically connected to said first depth sensor and said second battery, said first CPU having means for actuating the transmission of first depth signals corresponding to respective water depth data generated by said first depth sensor;

a second charging coil electrically connected to said second battery for inducing a current and charging said second battery, said second charging coil electrically connected to said first CPU for transmitting said first depth signals;

a second CPU electrically connected to said second depth sensor and said first battery, said second CPU having means for actuating the transmission of second depth signals corresponding to respective water depth data generated by said second depth sensor;

a first charging coil electrically connected to said first battery for inducing a current and charging said first battery, said first charging coil electrically connected to said second CPU for transmitting said second depth signals; and a receiver unit remote from said housing and having a receiver for receiving said first and second depth signals, said receiver unit having a user interface for indicating said corresponding water depth data determined by said first and second depth sensors to a user.

2. The fishing float as in claim 1, wherein:

said housing defines a center point;

said first and second light sources are positioned approximately equidistant from said housing center point; and said first and second orientation switches are positioned approximately equidistant from said housing center point.

3. The fishing float as in claim 1, further comprising a first CPU electrically connected to said second light source, said first CPU having means for actuating said second light source to indicate respective water depth data generated by said first depth sensor.

4. The fishing float as in claim 1, further comprising:

a first CPU electrically connected to said second light source, said first CPU having means for actuating said second light source to indicate respective water depth data generated by said first depth sensor; and a second CPU electrically connected to said first light source, said second CPU having means for actuating said first light source to indicate respective water depth data generated by said second depth sensor.

5. The fishing float as in claim 1, wherein:

said housing has an annular portion for slidably attaching said housing to a fishing line;

said housing has a bow-tie-shaped configuration; and said housing first portion includes a first color indicium and said housing second portion includes a second color indicium different from said first color indicium.

* * * * *